350-403    SR
OR    3,633,993

United States

[11] 3,633,993

| [72] | Inventor | Gerald K. Go......g |
| | | Philadelphia, Pa. |
| [21] | Appl. No. | 12,980 |
| [22] | Filed | Feb. 20, 1970 |
| [45] | Patented | Jan. 11, 1972 |
| [73] | Assignee | Sperry Rand Corporation |
| | | New York, N.Y. |

[54] LIGHT MODULATOR FOR PRODUCING LIGHT BEAM HAVING SINUSOIDALLY VARYING INTENSITY
4 Claims, 3 Drawing Figs.

| [52] | U.S. Cl. | 350/157, |
| | | 350/7, 350/150, 350/159 |
| [51] | Int. Cl. | G02b 27/28 |
| [50] | Field of Search | 350/6–7, |
| | | 147, 150, 157, 159 |

[56]          References Cited
         UNITED STATES PATENTS

| 3,324,295 | 6/1967 | Harris | 350/157 X |
| 2,913,586 | 11/1959 | Kates | 350/159 X |
| 3,355,591 | 11/1967 | Pfister | 350/7 UX |
| 3,183,763 | 5/1965 | Koester | 350/159 X |
| | | | 350/157 X |

*Primary Examiner*—David Schonberg
*Assistant Examiner*—Paul R. Miller
*Attorneys*—Charles C. English, Leonard Zalman and William E. Cleaver

ABSTRACT: A light modulator for producing a light beam having a sinusoidal intensity modulation comprising a rotating, uniaxial crystal disposed between a pair of polarizers having mutually orthogonal transmission axes. To produce a light beam having a sinusoidal intensity modulation of a substantially constant modulation frequency, an unmodulated light beam is passed through the modulator only during some portions of each revolution of the uniaxial crystal. Passage of the light beam through the modulator during the portions of each revolution of the uniaxial crystal is achieved either by an electro-optic crystal plus a polarizer located between the source of the unmodulated light beam and the polarizer nearer to the source or by a rotating, slotted cylinder encircling the rotating crystal and having the same angular velocity as the rotating crystal.

PATENTED JAN 11 1972
3,633,993
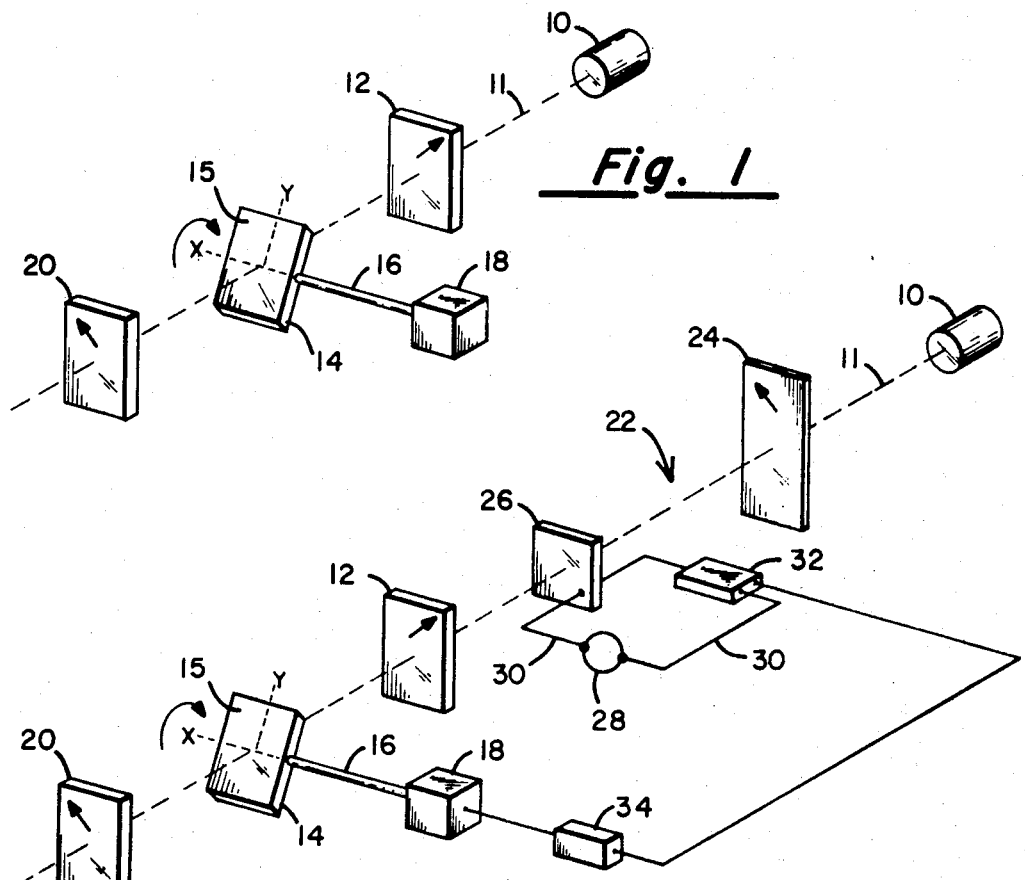
Fig. 1
Fig. 3
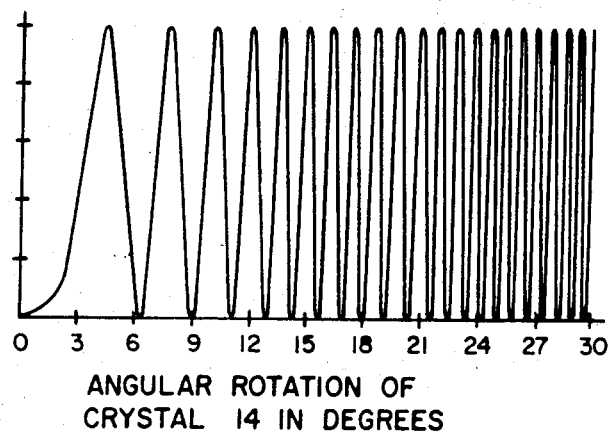
INTENSITY
OF OUTPUT
LIGHT BEAM
Fig. 2
ANGULAR ROTATION OF
CRYSTAL 14 IN DEGREES
INVENTOR
GERALD K. GOLDBERG
BY Leonard Zalman
ATTORNEY 3,633,993

LIGHT MODULATOR FOR PRODUCING LIGHT BEAM HAVING SINUSOIDALLY VARYING INTENSITY

There are many uses for a light beam whose intensity varies with time according to a sinusoidal relationship. For example, such a light beam could be used, in place of an electrical signal, for testing the linearity, frequency, and phase responses of a television transmission system. In addition, such a light beam could be useful in a computer utilizing optics or in an optical character recognition system.

For the most part, commercially available light modulators for producing a light beam whose intensity varies with time according to a sinusoidal relationship employ complicated mechanical light-chopping techniques. These techniques produce light beams of poor definition, that is, intensity variations more rectangular than sinusoidal, even though these techniques are expensive to implement.

Accordingly, it is an object of the present invention to provide an improved light modulator.

Another object of the present invention is to provide an improved light modulator which produces a light beam having a sinusoidal intensity modulation.

It is a further object of the present invention to provide an optical system which produces a light beam having both a sinusoidal intensity modulation and a substantially constant modulation frequency.

In accordance with the invention, the light modulator comprises a rotating, uniaxial crystal disposed between a pair of polarizers having mutually orthogonal transmission axes. Because of the anisotropic nature of the rotating, uniaxial crystal, the modulator produces an output light beam having a sinusoidal intensity modulation. When the modulator is used in conjunction with a light-pulsing apparatus which permits the input beam to traverse the modulator only during some portions of each revolution of the uniaxial crystal, the output beam has a sinusoidal intensity modulation of a substantially constant modulation frequency.

For a better understanding of the present invention together with other and further objects thereof, reference now should be had to the following detailed description which is to be read in conjunction with the accompanying drawing in which:

FIG. 1 is a perspective view of the light modulator of the present invention;

FIG. 2 is a graph showing the intensity of the output light beam of the modulator of FIG. 1 for a portion of the cyclic operation of that modulator; and FIG. 3 is a perspective view of an optical system including the light modulator of FIG. 1.

Referring now to the drawings and more particularly to FIG. 1, a source 10 projects along path 11 a light beam not constrained to any fixed direction of polarization. Source 10 can be a conventional arc light. Positioned along path 11 is a polarizer 12 which linearly polarizes the light beam incident thereon by transmitting substantially completely light energy to one direction of polarization, corresponding to the direction of its transmission axis, and attenuating light energy of all other directions of polarization. The linearly polarized light beam is incident upon a uniaxial crystal 14 which is attached to the shaft 16 of a motor 18. Shaft 16 rotates crystal 14 about the X axis at a constant angular velocity. Preferably, the direction of the optic axis of crystal 14 is perpendicular to the surface 15 of crystal 14.

The light passing through crystal 14, now elliptically polarized, as will be explained in detail hereinafter, is incident upon a polarizer 20 which, like polarizer 12, transmits substantially completely light energy incident thereon of one direction of polarization, corresponding to the direction of its transmission axis, and attenuates light energy of all other directions of polarization. The transmission axis of polarizer 12 is oriented in a direction orthogonal to the direction of the transmission axis of polarizer 20. For illustration, the direction of the transmission axis of polarizer 12 is shown at the angle $\pi/4$ and the direction of the transmission axis of polarizer 20 is shown at the angle $7\pi/4$.

When a linearly polarized light beam is incident transversely upon an optically anisotropic crystal, such as uniaxial crystal 14, the light beam is split as it traverses the crystal into two components having different directions of polarization. The velocity of propagation at any instant of each of these components is determined by the optical parameters of the anisotropic crystal and the angle at that instant between the direction of propagation of the component and the direction of the optic axis of the anisotropic crystal. When the two components emerge from the anisotropic crystal they recombine. Due to the difference in propagation velocities between the two light beam components as they traverse the crystal, the linearly polarized incident light beam emerges from the crystal as an elliptically polarized light beam.

I have found that, when crystal 14 is rotated and the elliptically polarized light beam produced from the incident linearly polarized light beam as a result of such rotation is polarized by polarizer 20, the output light beam of polarizer 20 varies in intensity with time according to a sinusoidal relationship. More specifically, the output light beam varies in intensity according to a sine-squared relationship. FIG. 2 is a graph showing the intensity of the output light beam for orientations of the surface 15 of crystal 14 from a position which is normal to path 11 (0°) to a position which makes an angle of 30° with path 11. The curve of FIG. 2 was calculated for a potassium dihydrogen phosphate (KDP) crystal having a thickness of 2 millimeters and an incident light beam having a wavelength of 6,328 angstroms. If either the material of crystal 14 or its thickness is changed the period of the sinusoidally modulated light beam will be different but the form of the intensity versus angular orientation curve for the new crystal will be very similar to the curve of FIG. 2.

A careful study of FIG. 2 indicates that for small angular orientations of crystal 14, hereinafter critical angular ranges, a light beam is generated by the light modulator of FIG. 1 which has both a sinusoidal intensity modulation and a substantially constant modulation frequency. In FIG. 2 a critical angular range extends from about 12.5° to about 19°.

Referring now to FIG. 3, wherein parts corresponding to like parts of FIG. 1 have the same reference numbers, there is shown a system which includes a light-pulsing apparatus 22 which permits light from source 10 to strike crystal 14 only during the critical angular range such that there is produced an output light beam having a sinusoidal intensity modulation of a substantially constant modulation frequency. Apparatus 22 includes a polarizer 24 and an electro-optic crystal 26 disposed serially along path 11 between source 10 and polarizer 12. Like polarizers 12 and 20, polarizer 24 transmits substantially completely light energy of one direction of polarization, corresponding to the direction of its transmission axis, and attenuates light energy of all other directions of polarization. For the illustration given in the description of FIG. 1, that is, with the transmission axes of polarizers 12 and 20 at $\pi/4$ and $7\pi/4$, respectively, the transmission axis of polarizer 24 would be at $7\pi/4$.

Apparatus 22 also includes a generator 28 which produces a high-voltage signal, leads 30 which couple the poles of generator 28 to different sides of crystal 26, a sync signal controlled switch 32 connected in one of the leads 30, and a sync signal generator 34 coupled between motor 18 and switch 32 which derives a sync signal from the movement of motor 18 and applies this signal to switch 32 to close switch 32 only during predetermined angles of rotation of crystal 14, that is, during the critical angular range.

In the operation of the system of FIG. 3 no voltage is applied to crystal 26 when crystal 14 is rotating through angles other than those within the critical angular range. When no voltage is applied to crystal 26, the linearly polarized light beam produced by polarizer 24 is extinguished by polarizer 12, due to the orthogonal directions of the transmission axes of polarizers 12 and 24, and a light beam is not incident on crystal 14. When crystal 14 is rotating through a critical angular range a sync signal is applied to switch 32 resulting in the application of a high-voltage signal across crystal 26. Crystal 26 then rotates by 90° the direction of the plane of polarization of the light beam incident thereon and this light is passed now by polarizer 12 and incident on rotating crystal 14. When crystal 14 has rotated through the critical angular range, the sync signal causes the high-voltage signal to be removed from crystal 26 thereby extinguishing the light beam previously incident on crystal 14. Thus, since light is incident on crystal 14 only during the critical angular range, the system of FIG. 3 produces a light beam having both a sine-squared modulation function and substantially constant modulation frequency.

Since crystal 14 will pass again through the critical angular range when it has rotated 180°, a light beam having a sine-squared intensity modulation and little frequency distortion can be generated twice during each revolution of crystal 14. If the material and thickness of crystal 14 is chosen so that the critical angular range is centered about 45°, the repetition frequency of the generation of a light beam having a sine-squared intensity function and little frequency distortion can be achieved four times during each revolution of crystal 14.

The system of FIG. 3 was tested using a helium-neon laser producing a light beam having a wavelength of 6,328 angstroms as source 10, HN 22 sheet polarizers as polarizers 12, 20 and 24, a Spectra-Physics electro-optic light modulator model 320 as crystal 26, a deuterated KDP crystal 3 millimeters thick as crystal 14, and a one-fiftieth horsepower DC motor variable to 5,000 revolutions per minute and operated at 3,000 revolutions per minute as motor 18. The results of this test showed that the distortion of the sine-squared intensity modulated light beam produced by the system of FIG. 3 is quite low, more precisely, about 5 percent. However, it is believed that distortion can be reduced to about 0.25 percent. When crystal 14 was rotated at 3,000 revolutions per minute, the system produced amplitude modulation at a frequency of 9.95 kilocycles. When crystal 14 was rotated at the maximum revolutions per minute of motor 28, the modulation frequency increased to about 50 kilocycles.

While the invention has been described with reference to particular embodiments thereof, various modifications can be made without departing from the invention. For example, the direction of the optic axis of crystal 14 can be transverse to surface 15 of crystal 14. In addition, crystal 14 can be rotated by appropriate means about the Y-axis.

In addition, a mechanical light-pulsing apparatus can be used in FIG. 3 in lieu of the electro-optic light-pulsing apparatus 22 of FIG. 3. An appropriate mechanical light-pulsing apparatus could take the form of a rotating, slotted cylinder encircling the rotating crystal 14 and having the same angular velocity as crystal 14. The slots would be positioned around the periphery of the cylinder such that a pair of them pass through the projection path of the input light beam each time the uniaxial crystal is rotating through a critical angular range.

I claim:

1. A light modulator for producing a light beam having a sinusoidal intensity modulation comprising
    first means for projecting a light beam of substantially constant amplitude along a predetermined path;
    a pair of polarizers positioned along said path at different distances from said first means, the transmission axis of each polarizer is oriented in a different direction;
    a uniaxial crystal positioned along said path intermediate said pair of polarizers; and
    second means coupled to said crystal for continuously rotating the optic axis of said crystal with respect to said path thereby to produce a frequency modulated light beam.

2. The light modulator according to claim 1 wherein the transmission axes of said polarizers are mutually orthogonal.

3. The light modulator according to claim 2 wherein said second means rotates said crystal at a substantially constant angular velocity.

4. The light modulator according to claim 1 further including third means having at least a component positioned along said path at a point beyond said polarizer more remote from said first means for permitting the modulated light beam to continue to propagate along said path beyond said third means only during some portions of each revolution of said crystal.

* * * * *